April 15, 1924.
N. SCRIPA
1,490,717
TRACTION DRIVEN SLED
Filed June 19, 1923    2 Sheets-Sheet 1
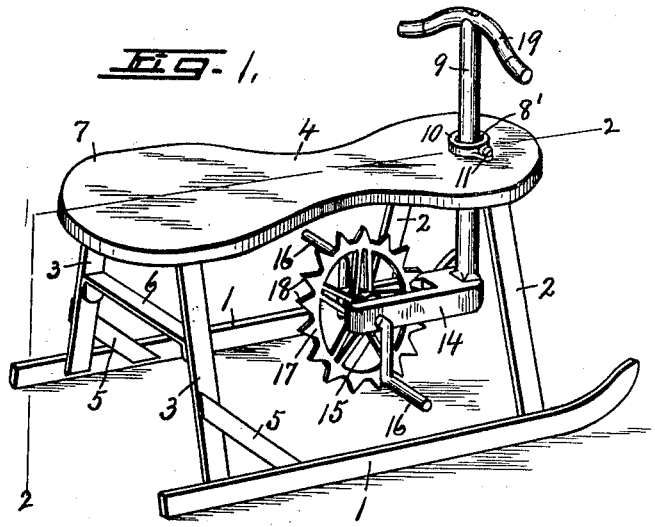
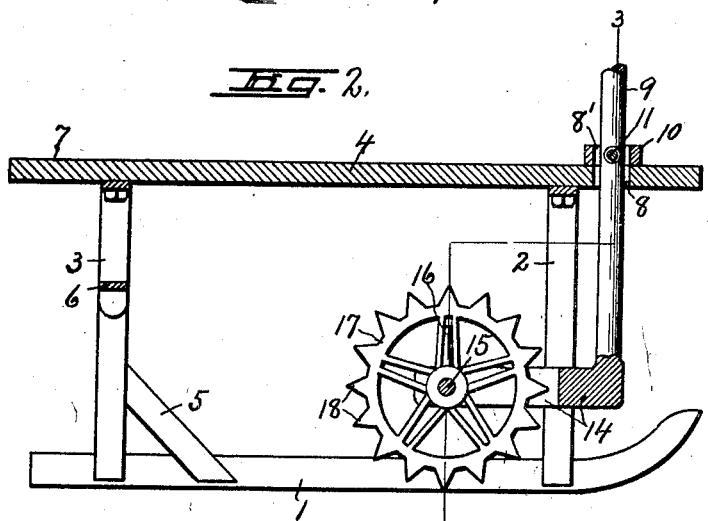
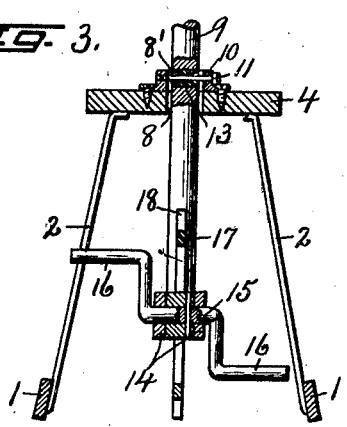
INVENTOR
N. Scripa
BY Howard P. Denison
ATTORNEY April 15, 1924.
N. SCRIPA
TRACTION DRIVEN SLED
Filed June 19, 1923 2 Sheets-Sheet 2
1,490,717
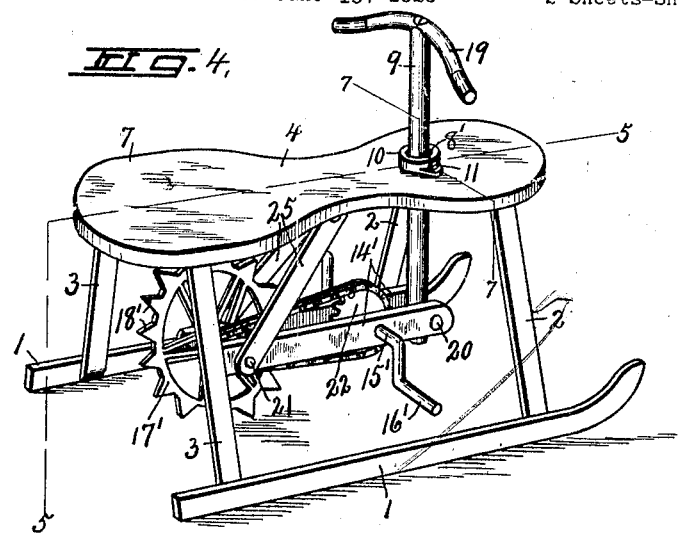
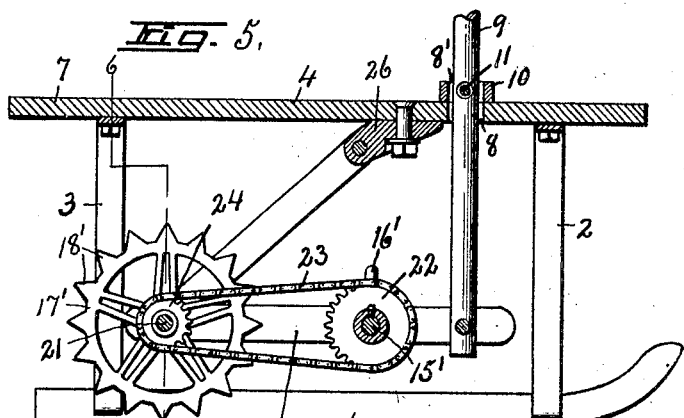
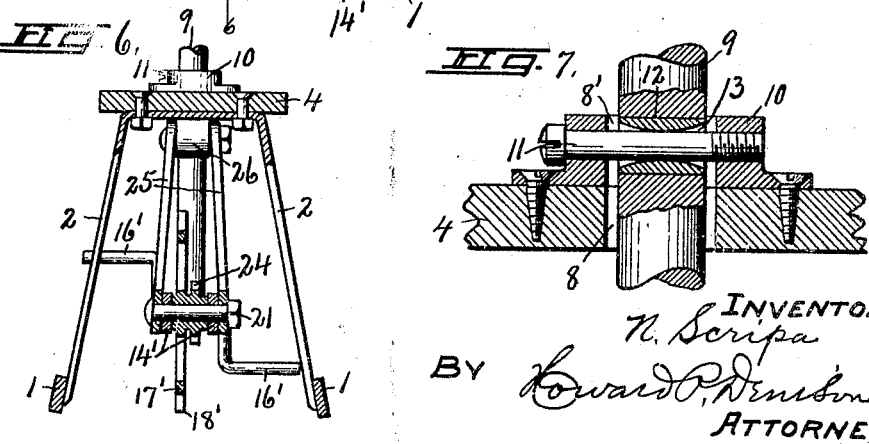
INVENTOR
N. Scripa
BY Howard P. Denison
ATTORNEY Patented Apr. 15, 1924.

1,490,717

UNITED STATES PATENT OFFICE.

NICHOLAS SCRIPA, OF SYRACUSE, NEW YORK.

TRACTION-DRIVEN SLED.

Application filed June 19, 1923. Serial No. 646,341.

*To all whom it may concern:*

Be it known that I, NICHOLAS SCRIPA, a subject of the King of Italy, of Syracuse, in the county of Onondaga, in the State of New York, have invented new and useful Improvements in Traction-Driven Sleds, of which the following, taken in connection with the accompanying drawings, is a full, clear, and exact description.

This invention relates to a tractor sled having a pedal operated tractor wheel adapted to engage the pavement for propelling the sled along the surface thereof together with a suitable steering post operatively connected to the tractor wheel for directing the movement of the sled.

The steering post is mounted in a suitable opening in the platform within convenient reaching distance from the seat forming the rear end of the platform, while the traction wheel and the driving pedals are located below the platform with the pedals in convenient reaching distance from the operator's seat.

The main object is to support the steering post on the frame of the sled preferably upon the platform by means of a universal joint which will permit its free rocking movement in all directions radial to its axis in addition to its rocking movement about said axis, and to connect the support for the traction wheel to the steering post in such manner that the latter will be forced into and of contact with the pavement by the rearward and forward rocking movement of the upper end of the steering post.

That is, when the operator is sitting up on the seat in the act of rotating the traction wheel by means of the pedal cranks with the hands on the handle bars on the upper end of the steering post, the forward pressure of the feet upon the pedals tends to urge the operator rearwardly along the seat which movement, however, is resisted by engagement of the hands with the handle bars of the steering post, thereby exerting a rearward pull upon the handle bars, simultaneously with the downward and forward pressure upon the pedals, and one of the specific objects of the present invention is to utilize these combined forces in pressing the traction wheel into tractional engagement with the pavement for propelling the sled forwardly as the pedal shaft is rotated.

Another specific object is to utilize the turning movement of the steering post about its axis for imparting a similar lateral movement to the traction wheel for steering purposes.

Other objects and uses relating to specific parts of the tractor sled will be brought out in the following description.

In the drawings,

Figure 1 is a perspective view of the simplest form of my invention in which the tractor wheel is mounted directly upon the crank shaft and the latter is supported by a frame rigidly secured to the lower end of the steering post.

Figure 2 is an enlarged longitudinal vertical sectional view of the same sled taken on line 2—2, Figure 1, except that the upper portion of the steering post is broken away.

Figure 3 is a transverse vertical sectional view taken in the planes of line 3—3, Figure 2.

Figure 4 is a perspective view of a modified tractor sled in which the tractor wheel is mounted on a separate shaft from that of the pedal shaft and is driven from the latter through the medium of a sprocket wheel and a chain connecting the same, the supporting frame for the tractor wheel and crank shaft being hingedly connected to the lower end of the steering post and also connected by suitable links to the platform for relative vertical rocking movement.

Figure 5 is an enlarged longitudinal vertical sectional view taken on line 5—5, Figure 4.

Figure 6 is a transverse vertical sectional view taken in the plane of line 6—6, Figure 5, and Figure 7 is a further enlarged detail sectional view taken on line 7—7, Figure 4, showing more particularly the universal joint between the steering post and platform of the sled.

The main frame of the sled shown in Figures 1 to 7 inclusive comprises a pair of runners —1—, front and rear upright braces —2— and —3—, having their lower ends rigidly secured by any suitable fastening means to the runners —1— and their upper ends rigidly secured to a suitable platform —4— and if necessary, the frame may be additionally braced by supplemental braces —5— and —6— as shown in Figures 1 and 2.

The rear end of the platform —4— constitutes a seat —7— for the operator directly over the rear braces —3— while the front end of the same platform is provided with a vertical opening —8— for receiving a steering post —9—, and is also provided with a collar —10— rigidly secured to the upper face thereof and is also provided with a vertical opening —8'— registering with the opening —8— for receiving said steering post, the openings —8— and —8'— being of relatively larger diameter than that of the steering post to permit slight lateral tilting movement of the post therein in addition to a slight turning movement about its axis for steering purposes.

The steering post —9— and collar —10— are provided with diametrically extending registering openings for receiving a pivotal bolt —11— which extends transversely of the longitudinal center of the sled for supporting the steering post thereon and permitting it to rock forwardly and rearwardly, said post being provided with a sleeve —12— inserted in the bolt opening therein and itself provided with a center opening which is —13— gradually increasing in diameter from its center toward its ends so as to allow a slight turning movement of the post about its axis and also to allow a limited lateral tilting movement in all directions in addition to its forward and rearward rocking movement.

The bolt —11— and sleeve —12— constitutes what may be termed a universal joint connection between the steering post and frame or platform —4— to permit the various angular movements of the steering relatively to said platform and about its own axis, all of which movements are utilized in the tractional engagement of the wheel with the pavement for propelling and steering purposes.

In the sled shown in Figures 1 to 3 inclusive, the lower end of the steering post below the platform —4— is provided with a rearwardly projecting tractor supporting arm —14— having its forward end rigidly secured to the steering post and its rear end provided with a journaled bearing for receiving and supporting a laterally extending crank shaft —15— having opposite pedals —16— adapted to be engaged by the feet of the operator for rotating said shaft.

The rear end of the arm —14— is preferably bifurcated for receiving a traction wheel —17— which is secured to the intermediate portion of the crank shaft —15— and is provided with radial spur teeth —18— for engagement with the surface of the pavement for the purpose of propelling the sled, along the pavement as the crank shaft is rotated.

The upper end of the steering post —9— is provided with a handle bar —19— extending laterally in opposite directions therefrom so that its opposite ends may constitute handles adapted to be engaged by the operator when sitting on the seat —7—.

In Figures 4 to 7 inclusive, is shown a tractor supporting arm —14'— extending rearwardly from the lower end of the steering post —9— and having its forward end secured thereto by a pivotal bolt —20— and its rear end bifurcated for receiving a traction wheel —17'— which is mounted upon a suitable shaft —21— journaled in opposite sides of the arm —14'—.

A crank shaft —15'— is also journaled on the arm —14'— between the steering post —9— and traction wheel —17'— and has its opposite ends provided with pedals —16'— by which it may be rotated.

The intermediate portion of the crank shaft —15'— is provided with a sprocket wheel —22— connected by a chain —23— to a rear but somewhat smaller sprocket wheel —24— on the shaft —21— for transmitting rotary motion to the traction wheel —18'—, the latter being somewhat similar to the traction wheel —17— previously described in that it is provided with radial spur teeth —18'—.

If desired, the rear end of the arm —14'— may be connected to the underside of the platform —4— by upwardly and forwardly extending links —25— having their upper ends pivotally connected to a bracket —26— on the underside of said platform and their lower ends pivotally mounted upon the shaft —21— as shown in Figures 4 and 6, but it is evident that these links may be omitted if desired without materially effecting the operation of this part of the device by reason of the fact that the arm —14'— with the parts mounted thereon would be supported and controlled by the steering post.

By mounting the arm —14— or —14'— upon the lower end of the steering post —9— to extend rearwardly therefrom, and by placing the crank shaft —15— or —15'— and tractor wheel —17— or —17'— upon said arm at the rear of the post, allows the traction wheel to be pressed into engagement with the pavement by the pressure of the feet of the operator upon the pedals —16— or —16'— in the act of propelling or rotating said traction wheel for propelling the sled at which time, the hands of the operator would be engaged with the handle bar —19— on the upper end of the steering post thereby exerting a rearward pull upon the handle bar and resultant forward movement of the lower end of the steering tending also to force the traction wheel into engagement with the pavement, the two forces being simultaneous and therefore, affording the desired traction for propelling the sled.

What I claim is:

1. In a tractor sled, of the character described, the combination of a frame having a platform, and runners, a steering post pivotally mounted upon the frame to rock forwardly and rearwardly, a traction wheel, means for rotating the traction wheel, and means actuated by the rearward rocking movement of the upper end of the steering post for forcing the traction wheel into engagement with the pavement as said traction wheel is rotated.

2. In a tractor sled of the character described, the combination of a frame having a platform and runners, a steering post, a universal joint connection between the steering post and frame to permit a limited lateral and forward and rearward rocking movement of said steering post, a traction wheel, means including a pedal shaft for rotating the traction wheel, and means actuated by the forward and rearward movement of the steering post for raising and lowering the traction wheel from and against the surface of the pavement along which the runners travel.

3. In a tractor sled of the character described, the combination of a frame having runners, a steering post journaled on the frame to rotate about its axis and having an independent forward and rearward rocking movement, a traction wheel, means including a crank shaft for rotating the traction wheel, and means actuated by the rearward rocking movement of the steering post for forcing the traction wheel into engagement with the pavement.

In witness whereof I have hereunto set my hand this 4th day of June 1923.

NICHOLAS SCRIPA.

Witnesses:
H. E. CHASE,
RITA CAMPOLIETO.